United States Patent [19]

Nichols et al.

[11] Patent Number: 5,096,597

[45] Date of Patent: Mar. 17, 1992

[54] SURFACTANTS IN DEWATERING SODIUM BICARBONATE

[75] Inventors: Richard D. Nichols, Las Vegas, Nev.; Peter V. Avotins, Easton, Conn.; A. Grady Williams, Montrose, Ala.

[73] Assignee: American Cyanamid Company, Stamford, Conn.

[21] Appl. No.: 618,333

[22] Filed: Nov. 26, 1990

[51] Int. Cl.$^5$ ............................................. C02F 29/78
[52] U.S. Cl. .................................. 210/728; 210/729; 210/772; 210/778; 423/422
[58] Field of Search ..................... 210/778, 727–729, 210/772; 423/422, 423

[56] References Cited

U.S. PATENT DOCUMENTS

| | | | |
|---|---|---|---|
| 3,969,247 | 7/1976 | Emmett, Jr. et al. | 210/771 |
| 4,097,390 | 6/1978 | Wang et al. | 252/60 |

FOREIGN PATENT DOCUMENTS

| | | | |
|---|---|---|---|
| 0094745 | 11/1983 | European Pat. Off. | 210/778 |
| 2079698 | 10/1971 | France | 210/778 |

*Primary Examiner*—Peter Hruskoci
*Attorney, Agent, or Firm*—Frank M. Van Riet

[57] ABSTRACT

Improved filtration rates and decreased sodium chloride and moisture content in sodium bicarbonate filter cakes are obtained by including a filter aid containing a mono and/or dialkylester of sodium sulfosuccinate in the filter feed suspension.

6 Claims, No Drawings

SURFACTANTS IN DEWATERING SODIUM BICARBONATE

The present invention relates to a method for providing improvements in filtration rates and decreased sodium chloride and moisture content in sodium bicarbonate filter cakes in which a mono and/or dialkylester of sodium sulfosuccinate is added to the filter feed suspension.

BACKGROUND OF THE INVENTION

Sodium bicarbonate has long been obtained from brine wells wherein hot water is pumped into subterranean mineral deposits, the sodium bicarbonate therein dissolves in the hot water and the resultant solution is pumped to the surface through a second well and, on cooling, the sodium bicarbonate precipitates and is isolated by filtration. In modern, commercial operations, the brine wells are operated at large volumes and the rate of filtration is critical to an economical process. Any modification that can accelerate the rate of slurry filtration is desirable. Furthermore, natural brines also contain sodium chloride as a contaminant which must be eliminated or at least reduced to a low level to produce an acceptable final product. Drying of the filter cake is also a costly operation and any procedure that will increase the drying rate increases the economic feasibility of the process.

Attempts to correct these three problems of slower than desirable filtration rates, sodium chloride contamination and excess filter cake moisture retention have comprised; 1) the use of additional filter equipment to handle the filtration volume but this results in longer slurry retention time in the filters; 2) the removal of salt by fresh water washes of the sodium bicarbonate brine cake but this results in a loss of sodium bicarbonate with the removal of sodium chloride and 3) the extension of the drying cycle but this results in longer drying times. All of these operations, moreover, have resulted in an added cost to the overall process.

SUMMARY OF THE INVENTION

According to the present invention, there is provided a method of filtering an aqueous suspension of sodium bicarbonate, the improvement consisting of improving filtration rates and decreasing the sodium chloride and moisture content of the filter cake by adding to the suspension or to the wash of the filter cake an effective amount of a filter aid comprising a mono and/or dialkylester of sulfosuccinic acid and/or its sodium, potassium or ammonium salts, wherein the alkyl ester group contains 2-20 carbon atoms and is linear, branched or cyclic and a linear, branched or cyclic $C_2$ to $C_{20}$ alcohol or ether alcohol or any other water miscible organic solvent and optionally, water.

A preferred composition consists of a solution of sodium bis(2-ethylhexyl)sulfosuccinate and the ethoxylated half ester of disodium sulfosuccinate in a combination solvent of ethoxylated alcohol, isobutanol, propoxypropane and water. The addition of this filter aid at low levels to the brine filter feed increases filter capacity and lowers cake sodium chloride and moisture content.

DETAILED DESCRIPTION OF THE INVENTION

Sodium sulfosuccinate esters are very effective wetting agents that have been in commercial use for many years. Their preparation is described in U.S. Pat. Nos. 2,028,091 and 2,176,015. These esters occur as wax-like solids that even after grinding revert back to their original waxy state and are very difficult to handle and dissolve. Thus, the esters are generally used as solutions.

The filter aid compositions useful in the process of the present invention comprise mono and/or dialkylesters of sulfosuccinic acid and/or its salts and/or mixtures thereof. The alkyl groups may contain from 2-20 carbon atoms. Suitable compounds include the mono- and/or di-ethyl, propyl, butyl, cyclohexyl, octyl, dodecyl, octadecyl, etc. sulfosuccinate esters. The alkali and alkaline earth metal and ammonium salts may be used.

Preferably, the sulfosuccinic acid esters and/or their salts are employed as solutions in any water-miscible organic solvent. Alcohols and ether alcohols such as ethanol, methanol, isopropanol, 2-ethyl-hexanol, methoxyethanol, isobutanol, propoxypropanol and the like, alone or in admixture, have been found to be useful solvents.

The addition of water to the compositions has also proven to be effective.

The amount of solvent employed in the compositions ranges from about 5-70 parts, by weight, based on the total weight of the composition; the amount of sulfosuccinate ester employed ranges from about 5-70 parts, by weight, same basis, and the amount of water employed ranges from about 0 to 10 parts, or more, same basis.

An effective amount of the filter aid is used, said amount generally being ascertained by routine experimentation. Amounts ranging from about 0.2 to about 5.0 lbs. of filter aid per ton of sodium carbonate suspension, based on solids, are generally useful.

The filter aid can be added to the sodium bicarbonate suspension prior to filtration or to the wash water (filtrate) resulting from the filtration, followed by further solids separation. Addition to the suspension per se is preferred.

It is found that on addition of the above-described ester solutions to the filter feed of a commercial brine well increases the filter rate on the average from 1,600 to 1,900 gallons per minute (G.P.M.). This increase of 300 G.P.M. per filter translates into an 18% increase in filter capacity.

Samples of the filter cakes from the filtration wherein the esters are employed are analyzed for sodium chloride every two hours. Comparison of the cakes from the brine solution shows a drop in sodium chloride from 1.5% to 0.90% or a 40% decrease. Washing a control cake with large volumes of water with subsequent loss of sodium bicarbonate only reduces the sodium chloride to 0.90% to 0.73%. Thus, the filter aid of this invention results in a purer product without further water wash.

The moisture content of the control cakes in the commercial slurry filtrations are 14% on an average. Those produced in accordance with the instant process average 7% to 10% and are so dry that a light spray mist is sometimes added to the filter cake to control dusting.

The addition of the filter aids of this invention are readily accomplished in commercial operations, at low cost and achieve the objectives of increased filtration rates, with a product of lower sodium chloride and moisture content.

DESCRIPTION OF THE PREFERRED EMBODIMENTS

The following examples illustrate the present invention. They are not to be construed to limit the claims in any manner whatsoever.

Filter aids used in the examples are:

FILTER AID NO. 1

A composition of 38–40 parts of sodium bis(2-ethylhexyl)sulfosuccinate; 7–10 parts of 2-ethylhexanol; 3–4 parts of ethanol and 50 parts of water.

FILTER AID NO. 2

A composition of 50.4 parts of the ethoxylated alcohol made by reacting 3 moles of ethylene oxide with $C_{12}$ and/or $C_{13}$ linear alcohols; 7.1 parts of isopropanol; 7.1 parts of methoxyethanol; 9.3 parts of bis(2-ethylhexyl)sulfosuccinate; 2.3 parts of the ethoxylated half ester of disodium sulfosuccinate and 23.8 parts of water.

FILTER AID NO. 3

A composition of 50.4 parts of the ethoxylated alcohol made by reacting 3 moles of ethylene oxide with $C_{12}$ and $C_{13}$ linear alcohols; 7.1 parts of isobutyl alcohol; 7.1 parts of propoxypropanol; 9.3 parts of sodium bis(2-ethylhexyl)sulfosuccinate; 2.3 parts of the ethoxylated half ester of disodium sulfosuccinate and 23.8 parts of water.

EXAMPLE 1

Filter aid added to the filter feed and no spray wash

Untreated filter feed samples are obtained from a commercial brine well and continuously agitated to maintain the suspension. Samples of 500 ml. of the suspension are filtered on a Buchner Funnel. Rates of filtration, as well as the sodium chloride and moisture content of the retained sodium bicarbonate cake isolated, are determined.

The following filter aids are stirred into 500 ml of the above brine samples and filtered without a spray wash:

TABLE I

| Filter Aid | Filter Aid Dosage lbs/ton | Drainage Seconds | NaCl % | Moisture % |
|---|---|---|---|---|
| 0 | 0 | 26.0 | 5.71 | 19.3 |
| NO. 1 | 1.67 | 24.2 | 4.74 | 19.3 |
| NO. 2 | 1.67 | 22.2 | 4.43 | 18.3 |

In the cake drying test, the blank sample requires 26.0 seconds of filtration time. This compares to 24.2 seconds using 1.67 lbs/ton of Filter Aid No. 1 and 22.2 seconds for 1.67 lbs/ton of Filter Aid No. 2. This represents 7% to 14% decreases in filtering time over the blank test.

EXAMPLE 2

Filter aid added to the feed with water spray wash

To 500 ml brine well samples, as in Example 1, filter aids are added to the suspension which is filtered on a Buchner Funnel and then washed with a spray of 100 ml of plain water. The results are as follows:

TABLE II

| Filter Aid | Filter Aid Dosage lbs/ton | Drainage Seconds | NaCl % | Moisture % |
|---|---|---|---|---|
| 0 | 0 | 29.2 | 0.48 | 13.1 |
| NO. 1 | 1.67 | 29.1 | 0.36 | 10.6 |
| NO. 2 | 1.67 | 24.9 | 0.25 | 12.6 |

The added 100 ml of wash water sprayed on to the caked slows the filtration time to 29.2 seconds for the blank, 29.1 seconds for the Filter Aid No. 1 sample and 24.9 seconds for the Filter Aid No. 2 sample. Filter Aid No. 1 has little affect on the filtration time but Filter Aid No. 2 decreases the time by 14%. The added water wash has a significant affect on the sodium chloride content of the cake lowering it to 0.48% for the sample without a filter aid. Filter aids lower the content to 0.36% with Filter Aid No. 1 and 0.25% with Filter Aid No. 2. The latter represents a 48% reduction over the blank control sample.

EXAMPLE 3

Filter aids used only in the wash

After adding the filter aid only to the wash solution, the sodium chloride and moisture retention in the cake are measured. Brine well samples of 500 ml are filtered on a Buchner Funnel as in Example 1 and the cake is washed as shown:

TABLE III

| Filter Aid | Volume of wash solution (ml) | Filter Aid Dosage (lbs/ton) | NaCl (%) | Moisture (%) |
|---|---|---|---|---|
| 0 | 200 | 0 | 0.39 | 14.9 |
| NO. 1 | 50 | 1.67 | 0.22 | 14.4 |
| NO. 1 | 200 | 1.67 | 0.31 | 9.8 |
| NO. 1 | 200 | 0.84 | 0.27 | 12.7 |
| NO. 1 | 200 | 0.42 | 0.21 | 11.4 |
| 0 | 200 | 0 | 0.39 | 14.9 |
| NO. 2 | 50 | 1.67 | 0.23 | 14.4 |
| NO. 2 | 200 | 1.67 | 0.33 | 10.4 |
| NO. 2 | 200 | 0.84 | 0.31 | 12.6 |
| NO. 2 | 200 | 0.42 | 0.29 | 11.4 |

The reduction of sodium chloride content in the filter cake from 0.39% to 0.21% using 0.42 lb/ton of Filter Aid No. 1 is a 46% reduction. Filter Aid No. 2 reduces the sodium chloride content from 0.39% to 29% or a 26% reduction at a concentration of 0.42 lb/ton. Thus, further addition of low concentrations of filter aid to the wash water is of value in lowering the filter cake sodium chloride content.

The moisture content of 14.9% for the blank is reduced to 9.8% when 1.67 lbs/ton of Filter Aid No. 1 is used in the wash or a 34% reduction. Using Filter Aid No. 2 at 1.67 lbs/ton, the moisture in the filter cake is reduced to 10.4% or a reduction of 30% from that of the blank. Use of a filter aid in the wash therefore also lowers the moisture content of the cake.

EXAMPLE 4

Filter Aid No. 1 filter capacity increase

To the sodium bicarbonate suspension from a commercial brine well is continuously added 1.0 lb/ton of Filter Aid No. 3. The suspension is filtered at a filter feed of from 1,500 to 2,000 gallons per minute (G.P.M.) using two industrial filters numbered 3 and 4. The rate of filtration versus time is shown in Table IV, below.

TABLE IV

| Time | Filter Feed G.P.M. | |
|---|---|---|
| | Filter #3 | Filter #4 |
| C 16:48 | 1,576 | 1,671 |
| C 17:00 | 1,537 | 1,561 |
| 17:12* | 1,717 | 1,642 |
| 17:24 | 1,759 | 1,808 |
| 17:36 | 1,801 | 1,709 |
| 17:48 | 1,670 | 2,007 |
| 18:00 | 1,847 | 1,720 |
| 18:12 | 1,955 | 1,869 |
| 18:24 | 1,927 | 1,888 |
| 18:36 | 1,925 | 1,811 |
| 18:48 | 1,955 | 1,883 |
| 19:00 | 1,874 | 1,960 |
| 19:12 | 1,871 | 1,944 |
| 19:24 | 1,981 | 1,967 |
| 19:36 | 1,928 | 1,944 |

C = Comparative Test
* = Start of filter aid addition

Data taken at 16 hours and 48 minutes (16:48) indicates that both Filter #3 and #4 are averaging about 1,500 to 1,700 G.P.M. of feed flow. Addition of Filter Aid No. 3 begins at 17:12 and capacity increase on both filters is immediate. Increased feed rates stabilize at 19:36 at about 1,900 G.P.M. The sudden increased capacity causes both filters to be out of balance while the plant computer searches for the most favorable flow rate for the down stream dryer. This "control searching" easily corrects itself and by 18:00 the system has become stable. These higher production rates through the filter continue throughout the test. On average, a 300 G.P.M. increase per filter is obtained.

EXAMPLE 5

Sodium chloride reduction in the filter cake

The sodium chloride content of the filter cakes in the plant run of Example 4 and control tests are determined and shown in Table V. The analysis of the cakes in Filters #3 and #4 are compared to control Filters #1, #2, #5 and #6 wherein the cake is washed with a large amount of spray wash water to obtain lower sodium chloride residues at a sacrifice in filter capacity.

TABLE V

| | Sodium Chloride Content | | | | | |
|---|---|---|---|---|---|---|
| Time Hr:Min. | Filter C #1% | Filter C #2% | Filter #3% | Filter #4% | Filter C #5% | Filter C #6%** |
| 18:00 | 1.55 | 1.70 | 1.50 | 1.42 | 2.53 | 0.88 |
| 20:00 | 1.53 | 1.99 | 1.57 | 1.02 | 1.73 | 0.90 |
| 22:00 | 1.61 | 2.05 | 0.94 | 0.98 | 1.65 | 0.92 |
| 0:00 | 1.57 | 1.73 | 0.90 | 0.88 | 1.67 | 0.82 |
| 2:00 | 1.46 | 1.78 | 0.94 | 0.84 | 1.71 | 0.86 |
| 4:00 | 1.30 | 1.92 | 0.94 | 0.90 | 1.94 | 0.75 |
| 6:00 | 1.36 | 1.88 | 0.96 | 0.86 | 2.01 | 0.82 |
| 8:00 | 1.46 | 1.88 | 1.07* | 0.96 | 1.92 | 0.73 |
| 10:00 | 1.48 | 1.94 | 1.07* | 0.94* | 1.96 | 0.79 |
| 12:00 | 1.57 | 2.17 | 0.84* | 1.05* | 2.26 | 0.79 |
| 14:00 | 1.48 | 1.92 | 0.96* | 1.17* | 2.30 | 0.79 |
| 16:00 | 1.40 | 1.84 | 1.42C | 1.23C | 2.55 | 0.86 |

C = Comparative Test
* = Filter Aid becomes depleted.
** = Cake is spray washed with wash water.

Samples are taken every two hours from the sodium bicarbonate dryers and show a dramatic drop in residual chloride when Filter Aid No. 3 is included in the feed. The retention time in the system is 4–6 hours. Testing with filter aid added to Filter #3 and #4 at 1.0 lb/ton begins at 17 hours and 12 minutes (17:12). The sodium chloride residues are running about 1.5% at 18:00 and drop to less than 1.0% at 22:00 and less than or equal to 0.90% at 0:00. These results are maintained through the morning hours when at 7:00 on Filter #3 Filter Aid No. 3 becomes depleted. Filter Aid No. 3 in Filter #4 does not become depleted. Filter Aid No. 3 in Filter #4 does not become depleted until 10:00. After losing filter aid, sodium chloride is seen to increase and the sodium bicarbonate dryers are back up to 1.42% on Filter #3 and 1.23% on Filter #4. It is noted that Filters #3 and #4 with Filter Aid No. 3 compete successfully with Filter #6 in the reduction of chlorides; however, Filter #6 uses a large amount of spray wash water to lower chlorides at a sacrifice in filter capacity. In general, Filter Aid No. 3 reduces chlorides by 40%.

EXAMPLE 6

Moisture reduction in the filter cake

The determination of moisture content of the filter cakes in the plant runs of Example 5 are shown in Table VI. Codes are as in Table V.

TABLE VI

| | Moisture Content | | | | | |
|---|---|---|---|---|---|---|
| Time Hr:Min. | Filter C #1% | Filter C #2% | Filter #3% | Filter #4% | Filter C #5% | Filter C #6%** |
| 17:12 | 12.6 | 19.9 | 15.4C | 13.2C | 13.1 | 11.1 |
| 19:00 | — | — | 6.8 | 11.2 | 11.2 | 13.4 |
| 23:00 | — | 12.4 | 8.3 | 10.2 | — | 10.9 |
| 3:00 | — | 12.8 | 6.7 | 10.4 | 14.8 | 14.0 |
| 7:00 | — | — | 13.3* | 12.6 | 16.9 | 15.3 |
| 11:00 | 11.7 | 13.0 | 10.3* | 11.8* | 15.6 | 12.2 |
| 15:00 | — | — | 12.9* | 14.2* | 16.3 | 16.3 |

Decreases in the moisture content of the filter cakes are seen with Filter Aid No. 3. The moisture content of the filter cakes before filter aid addition are 14% on an average. Moisture content of the filter cakes during testing averages from 7% to 10%. This represents a successful 3% to 5% moisture decrease in the filter cakes. A spray mist is added to Filter #4 to minimize the amount of dust generated by the dry filter cake and this increases the moisture of the cake from Filter #4 by approximately 1%. A summary of the results of Tables IV–VI shows that the addition of Filter Aid No. 3 to sodium bicarbonate brine well filter feed slurries at 1.0 lb/ton increases the filter capacities by 18%, reduces the sodium chloride filter cake residues by 40% and decreases the moisture content of the filter cake by 3% to 5%.

Many variations of the present invention will suggest themselves to those skilled in the art in light of the above detail description; all such obvious modifications are within the full intended scope of the appended claims.

We claim:

1. In a method of filtering an aqueous suspension of sodium bicarbonate wherein a sodium bicarbonate filter cake having a sodium chloride and moisture content is filtered from said aqueous suspension, the improvement comprising adding to the suspension an effective amount of a filter aid consisting essentially of A) a solution of bis(2-ethylhexyl)sulfosuccinate and the sodium ethoxylated half ester of disodium sulfosuccinate in water, ethoxylated alcohol, isopropanol and methoxyethanol or B) a solution of sodium bis(2-ethylhexyl) sulfosuccinate and the ethoxylated half ester of disodium sulfosuccinate in water, ethoxylated alcohol, isobutyl alcohol and propoxypropanol to improve the filter rate and decrease the sodium chloride and moisture content of the filter cake.

2. A method according to claim 1 wherein the filter aid is a composition consisting essentially of a solution of bis(2-ethylhexyl) sulfosuccinate and the sodium ethoxylated half ester of disodium sulfosuccinate in water, ethoxylated alcohol, isopropanol and methoxyethanol.

3. A method according to claim 1 wherein the filter aid is a composition consisting essentially of a solution of sodium bis(2-ethylhexyl) sulfosuccinate and the ethoxylated half ester of disodium sulfosuccinate in water, ethoxylated alcohol, isobutyl alcohol and propoxylpropanol.

4. In a method of filtering an aqueous suspension of sodium bicarbonate wherein a sodium bicarbonate filter cake having a sodium chloride and moisture content is filtered from said aqueous suspension and washed with a wash water, the improvement comprising adding to the wash water an effective amount of a filter aid consisting essentially of A) a solution of bis(2-ethylhexyl)-sulfosuccinate and the sodium ethoxylated half ester of disodium sulfosuccinate in water, ethoxylated alcohol, isopropanol and methoxyethanol or B) a solution of sodium bis(2-ethylhexyl) sulfosuccinate and the ethoxylated half ester of disodium sulfosuccinate in water, ethoxylated alcohol, isobutyl alcohol and propoxypropanol to decrease the sodium chloride and moisture content of the filter cake.

5. A method according to claim 4 wherein the filter aid is a composition consisting essentially of a solution of bis(2-ethylhexyl) sulfosuccinate and the sodium ethoxylated half ester of disodium sulfosuccinate in water, ethoxylated alcohol, isopropanol and methoxyethanol.

6. A method according to claim 4 wherein the filter aid is a composition consisting essentially of a solution of sodium bis(2-ethylhexyl)sulfosuccinate and the ethoxylated half ester of disodium sulfosuccinate in water, ethoxylated alcohol, isobutyl alcohol and propoxypropanol.

* * * * *